US007253238B2

(12) United States Patent
Griswold et al.

(10) Patent No.: US 7,253,238 B2
(45) Date of Patent: Aug. 7, 2007

(54) FLUOROALKYLSILYLATED MQ RESIN AND SOLVENT-RESISTANT PRESSURE SENSITIVE ADHESIVE COMPOSITION CONTAINING SAME

(75) Inventors: Roy Melvin Griswold, Ballston Spa, NY (US); Richard Paul Eckberg, Saratoga Springs, NY (US)

(73) Assignee: Momentine Performance Materials Inc., Wilton, CT (US)

( * ) Notice: Subject to any disclaimer, the term of this patent is extended or adjusted under 35 U.S.C. 154(b) by 181 days.

(21) Appl. No.: 11/104,102

(22) Filed: Apr. 12, 2005

(65) Prior Publication Data

US 2006/0229424 A1 Oct. 12, 2006

(51) Int. Cl.
*C08L 83/04* (2006.01)
*C08G 77/24* (2006.01)

(52) U.S. Cl. .......................... 525/477; 528/32; 528/42

(58) Field of Classification Search ..................... None
See application file for complete search history.

(56) References Cited

U.S. PATENT DOCUMENTS 4,549,003 A * 10/1985 Lim et al. ..................... 528/42
5,178,949 A 1/1993 Sakamoto et al.
5,371,155 A 12/1994 Kobayashi
5,436,303 A 7/1995 Lin
5,519,082 A 5/1996 Yoshino
5,599,893 A 2/1997 Asai et al.
5,616,403 A 4/1997 Eckberg et al.
5,753,318 A 5/1998 Eckberg et al.
5,777,047 A * 7/1998 Chung et al. ............... 525/478
5,798,429 A 8/1998 Hager et al.
5,880,227 A 3/1999 Kobayashi et al.
5,905,108 A 5/1999 Kushibiki et al.
5,919,526 A 7/1999 Eckberg et al.
6,074,703 A 6/2000 Eckberg et al.
6,107,418 A 8/2000 Mueller
6,512,059 B1 1/2003 Mueller
6,607,817 B1 8/2003 Imashiro et al.

* cited by examiner

*Primary Examiner*—Marc S. Zimmer
(74) *Attorney, Agent, or Firm*—Dominick G. Vicari

(57) ABSTRACT

A fluoroalkylsilylated MQ resin is obtained by reacting an MQ resin with a fluoroalkylsilane. Pressure sensitive adhesion compositions containing the fluoroalkylsilylated MQ resin as tackifier and, optionally, a silicone gum, e.g., a fluorosilicone gum, exhibit high levels of solvent resistance.

10 Claims, No Drawings

FLUOROALKYLSILYLATED MQ RESIN AND SOLVENT-RESISTANT PRESSURE SENSITIVE ADHESIVE COMPOSITION CONTAINING SAME

BACKGROUND OF THE INVENTION

This invention relates to silicone resins and, in particular, to MQ resins and their use as tackifying components in pressure sensitive adhesive (PSA) compositions.

Silicone-based PSA compositions are well-known materials and are widely used where good adhesive properties over a wide operating temperature range are required such as a label on the cylinder wall of an internal combustion engine or on an internal wall of a freezer compartment. These compositions are typically provided as blends of high molecular weight linear polydimethyl siloxane gums end-capped by silanol groups and tackifying, usually partially hydrolyzed, MQ resins derived, e.g., from the hydrolysis of trialkylchlorosilanes with tetraalkyl orthosilicates and/or aqueous dispersions of sodium silicate. A frequent variation in these compositions is the use of linear silicone gum bearing diphenylsiloxane or methylphenylsiloxane in place of some dimethylsiloxane. Because of the high molecular weight of both the silicone gum and the MQ tackifying resin, it is necessary that silicone-based PSAs be packaged and applied as solutions in aromatic or aliphatic hydrocarbon solvents. Silicone-based PSAs are normally cured (crosslinked) to improve adhesive properties by the addition of heat-activated organic peroxide curing catalysts, benzoyl peroxide (BPO) being commonly used for this purpose.

Since all components of a conventional silicone-based PSA composition are very soluble in, and are packaged and used in, aromatic and aliphatic hydrocarbon solvents, it is not surprising that even BPO-crosslinked silicone-based PSAs are readily attacked by these solvents. Solvents cause the adhesive to swell and to delaminate (lift off) from substrates to which they are applied.

There are certain silicone-based PSA applications for which a high level of solvent resistance is particularly desirable. Barcode labeling of various medical samples including biopsied tissue, blood, urine and other diagnostic materials is widely practiced by health care providers in hospital and other institutional settings in order to prevent loss of critical samples or their being confused with a different sample from other sources. Tissue samples, in particular, are packaged in porous thermoset plastic containers that permit free flow of dyestain solution, various solvents including alcohols and aromatic solvents, formalin, and other chemicals necessary to treat tissue samples for purposes of preservation and analysis. The barcode label is typically generated and affixed to the outside of the tissue-holding vessel prior to whatever sequence of washing, dyestain or other preparation is carried out. The entire sample holder is immersed for periods of time in a variety of aggressive media for up to hours at a time. It is critical that the adhesive securing the barcode label to the tissue container does not fail, i.e., does not lift off or delaminate, during these immersions. Similarly, thin sections of tissue sample are affixed to glass microscope slides for analysis; barcode labels applied to the glass slide must also resist attack by aggressive solvents and other diagnostic reagents. While the adhesive properties of silicone-based PSAs are well suited for use with barcode labels on glass and plastic substrates, it is highly desirable that the PSAs in these applications possess a high degree of solvent-resistance.

Fluoroalkylsilicone rubbers and coatings are well known for their good solvent resistance properties. Photocurable and thermally curable solvent-resistant materials of this type that are intended for protective and conformal coating applications are known from amongst others, U.S. Pat. Nos. 5,178,959; 5,616,403; 5,753,318; 5,919,526; and, 6,074,703.

U.S. Pat. No. 5,436,303 describes solvent-resistant PSAs containing blends of fluorosilicone polymers, silanol-containing MQ tackifier resins and resin-compatible diorganosiloxane polymers. These blends, while useful, are difficult to prepare and store since the highly fluorinated fluorosilicone polymers, or gums, employed therein are immiscible with conventional dimethylsilicone polymers and gums. Furthermore, the MQ resins in these blends, which are required to make the adhesive tacky, are also incompatible with fluorosilicone polymers. It is a matter of considerable difficulty to provide a solvent mixture in which all the polymeric components of the adhesive composition will remain soluble over the expected storage life of the product and after its application.

It is therefore desirable that a silicone-based PSA composition be provided that possesses good solvent resistance but is easily processed and stable both before and after application.

SUMMARY OF THE INVENTION

In accordance with the present invention, there is provided a fluoroalkylsilylated MQ resin which is especially suitable for use as a tackifier in pressure sensitive adhesive compositions requiring a high degree of solvent-resistance, e.g., those adhesive label applications mentioned above.

When used together with a fluorosilicone gum, the fluoroalkylsilylated MQ tackifying resin of this invention provides PSA compositions exhibiting exceptionally high levels of solvent resistance making them ideal for use in those environments involving exposure to high levels of solvent and/or lengthy solvent exposure times.

DETAILED DESCRIPTION OF THE INVENTION

Siloxane resins are known in the art. These resins, generally referred to as MQ resins, are soluble in aromatic solvents and contain M units, represented by the formula $R_3SiO_{1/2}$, and Q units, represented by the formula $SiO_{4/2}$. It is recognized that while MQ resins are primarily made up of M and Q units, there can be up to 5 mole percent D units, represented by the formula $R_2SiO$, and T units, represented by the formula $RSiO_{3/2}$. R is a monovalent hydrocarbon group and includes groups having from 1 to 6 carbon atoms, e.g., alkyl groups such as methyl, ethyl, and isopropyl; alkenyl radicals such as vinyl, allyl, ethylenyl, propenyl and hexenyl; and, cycloaliphatic groups such as cyclopentyl and cyclohexyl. R is advantageously methyl. The MQ resin is preferably a silanol-containing MQ resin having an M to Q ratio of from about 0.6:1 to about 1.2:1. The silicon-bonded hydroxyl group, or silanol, content of the MQ resin can range from about 0.2% to about 5%, advantageously from about 1% to about 3%, and better yet, from about 1.5% to about 2.5%, by weight of the total amount of MQ resin.

MQ resins are commercially available dissolved in an aromatic solvent such as xylene or toluene, generally as a 40 to 60 wt. % solution.

Fluoroalkylsilylation of the MQ resin is achieved by reacting the MQ resin with a fluoroalkylsilane possessing at least one hydrolyzable alkoxy group.

Suitable fluoroalkylsilylation reaction conditions include the use of an aromatic solvent such as xylene or toluene, temperatures on the order of from about 50° to about 150° C., and advantageously from about 80° C. to about 120° C., ambient pressure (although moderate levels of subatmospheric or superatmospheric pressure may be utilized), for periods of from about 30 minutes to about 6 hours, and advantageously from about 1 to about 2 hours or until the reaction is substantially complete.

Among the suitable fluoroalkylsilane reactants are those represented by the general formula:

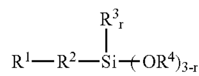

wherein $R^1$ is a partly or totally fluorinated alkyl group of up to 26 carbon atoms and advantageously possess from 1 to 20 carbon atoms; $R^2$ is a chemically stable divalent bridging group linking fluoroalkyl group $R^1$ with the alkoxy group(s) —$OR^4$, e.g., the group —$(CH_2)_n$— in which n is 2 to 20, the group —$(CH_2)_n$—X—$(CH_2)_p$— in which —X— is —O— or —C(O)O—, n is 0 to 2 and p is 5 to 25, or the group —Q—S—$(CH_2)_q$— in which Q is a divalent group containing at least one oxygen atom and q is 2 or 3; and, $R^2$ and $R^3$ each, independently, is alkyl of from 1 to 6 carbon atoms or aryl of from 6 to 8 carbon atoms, and r is 0, 1 or 2.

Illustrative of such fluoroalkylsilanes are 3,3,3-trifluoropropyltrimethoxy-silane, 3,3,3-trifluoropropyltriethoxysilane, 3,3,3-trifluoropropylmethyldimethoxysilane, 3,3,3-trifluoropropyldimethylmethoxysilane, 4,4,4-trifluorobutyltrimethoxysilane, 4,4,4-trifluorobutyltriethoxysilane, 3,3,4,4,4-pentafluorobutyltrimethoxysilane, 3,3,4,4,4-pentafluorobutyltriethoxysilane, 3,3,4,4,5,5,6,6,7,7,8,8,8-tridecafluroooctyltrimethoxy-silne, 3,3,4,4,5,5,6,6,7,7,8,8,8-tridecafluroooctyltrimethoxysilne, 3,3,4,4,5,5,6,6,7,7,8,8,9,9,10,10,10-heptadecafluorodecyltrimethoxysilane, 3,3,4,4,5,5,6,6,7,7,8,8,9,9,10,10,10-heptadecafluorodecyltriethoxysilane, 15-(trifluoroethoxy) pentadecyltrimethoxysilane, 15-(trifluoroacetoxy) pentadecylmethyldiethoxysilane, and the like. These and other fluoroalkylsilanes can be prepared by processes known in the art, e.g., as disclosed in U.S. Pat. Nos. 4,633,004, 5,011,963, 5,202,452 and 6,323,356, the entire contents of which are incorporated by reference herein.

The fluoroalkylsilylated MQ tackifier resin herein is combined with a silicone gum and, optionally, one or more known or conventional adhesive additives such as fillers, silane adhesion promoters, plasticizers, solvents, trixotropic agents, U.V. stabilizers, antioxidants, and the like, to provide a solvent-resistant pressure sensitive adhesive composition in accordance with this invention.

The silicone gum is typically a silanol-stopped polydimethylsiloxane, e.g., any of those disclosed in U.S. Pat. No. 5,602,214, the entire contents of which are incorporated by reference herein, and advantageously is a fluorosilicone polymer, e.g., any of those disclosed in U.S. Pat. No. 5,436,303, the entire contents of which are incorporated by reference herein. The term "fluorosilicone" refers to a polydimethylsiloxane in which some or all of the dimethylsiloxane units comprising the polymer are replaced by fluoroalkyl-methyl siloxane units. Fluorosilicone gums also possess increased solvent-resistance and have been found to exhibit good compatibility with the fluoroalkylsilylated MQ tackifier resins herein. The solvent-resistant properties of the fluorosilicones are obtained by the use of starting materials containing fluorosilicone homopolymers or copolymers of monomeric units such as $SiR^1R^2O$, also known as D; $SiR^1R^FO$, also known as $D^F$; $SiR^1R^3$, also known as $D^R$; $SiR^1{}_2R^2O_{1/2}$, also known as M or M" when alkenyl such as vinyl is present; and, $SiR^1R^2R^FO$, also known as $M^F$. In these monomeric units, $R^1$ and $R^2$ each, independently, is selected from alkyl groups having from 1 to 10 carbon atoms such as methyl, ethyl, propyl, butyl, pentyl, hexyl, and the like, alkenyl groups having from 1 to 10 carbon atoms such as vinyl, allyl, propenyl, or hexenyl, and the like, and aryl groups such as phenyl and arylalkyl having from 6 to 10 carbon atoms. $R^3$ is a silicon-containing pendent group of the general formula —$OSiR^1R^2R^F$ where $R^1$, $R^2$ and $R^F$ are as previously described.

Fluorosilicone gums and/or fluids of high viscosity, preferably of at least about 5000 cps at 25° C., are especially advantageous for combination with the fluoroalkylsilylated MQ tackifier resins herein. The fluorosilicone structures are high molecular weight gums or fluids containing silicone bonded organics including alkyls, aryls and arylalkyls, e.g., methyls and phenyls, and moieties including: trifluoroalkyls having 1 to 8 carbon atoms; fluorocyclics having 1 to 8 carbon atoms; perfluorinated alkyls having 1 to 8 carbon atoms; perfluorinated cyclics having 1 to 8 carbon atoms; and, partially or fully fluorinated alkyl, alkenyl, ether or ester groups attached to backbone silicon atoms. The presence of moieties partially compatible with fluorosilicones such as silanol and vinyl are desirable.

The silicone gum can be incorporated in the solvent-resistant pressure sensitive adhesive herein at a level of from about 33 to about 75 wt. % of the total composition, on a solids basis.

Typical fillers suitable for addition to the solvent-resistant PSA compositions of this invention include fumed silica, precipitated silica and calcium carbonates. Treated calcium carbonates having particle sizes from about 0.07μ to about 4μ are particularly useful and are available under several trade names: Ultra Pflex, Super Pflex, Hi Pflex from Specialty in Minerals; Winnofil SPM, SPT from Zeneca Resins; Hubercarb lat, Hubercarb 3Qt and Hubercarb W from Huber and Kotomite from ECC. These fillers can be used either alone or in combination. The fillers can comprise up to about 200 parts per 100 parts of the fluoroalkylsilylated MQ resin component with from about 80 to about 150 parts filler per 100 parts of the fluoroalkylsilylated MQ resin being especially suitable for most adhesive applications.

Silane adhesion promoters can be employed at levels of from about 0.5 to about 5 parts per hundred parts of the fluoroalkylsilylated MQ resin, and advantageously from about 0.8 to about 1.5 parts per hundred parts fluoroalkylsilylated MQ resin. Suitable adhesion promoters include the silanes Silquest A-1120, Silquest A-2120, Silquest A-1170 and Silquest A-187, all of which are available from GE Silicones.

Exemplary plasticizers include phthalates, dipropylene and diethylene glycol dibenzoates and mixtures thereof, epoxidized soybean oil, and the like. Dioctyl and diisodecylphthalate are commercially available under the trade names Jayflex DOP and JayFlex DIDP from Exxon Chemical. The dibenzoates are available as Benzoflex 9-88, Benzoflex 50 and Benzoflex 400 from Velsicol Chemical Corporation. Epoxidized soybean oil is available from Houghton Chemical Corporation as Flexol EPO. The plasticizer can comprise up to about 100 parts of the fluoroalkylsilylated MQ resin and fluorosilicone gum combination, and advantageously from about 40 to about 80 parts per hundred parts of such combination being satisfactory in many cases.

Useful solvents include aromatic, aliphatic and ester solvents ranging in amounts of from about 25 to about 75 parts per hundred parts by weight of the fluoroalkylsilylated MQ resin and fluorosilicone gum combination.

Illustrative of useful thixotropic agents are various castor waxes, fumed silica, treated clays and polyamides. These additives typically comprise about 1 to about 10 parts per hundred parts of total fluoroalkylsilylated MQ resin and fluorosilicone gum combination with from about 1 to about 6 parts being useful for most applications. The thixotropes include those available as: Aerosil from Degussa, Cabo-Sil TS 720 from Cabot, Castorwax from CasChem, Thixatrol and Thixcin from Rheox and Dislon from King Industries. If the thixotrope is reactive with silane (e.g., silica), adjustments to the amount formulated may be needed to compensate therefore.

U.V. stabilizers and/or antioxidants can be incorporated into the pressure sensitive adhesive compositions of this invention in an amount of from 0 to about 5 parts per hundred parts fluoroalkylsilylated MQ resin and fluorosilicone gum combination with from about 0.5 to about 2 parts providing generally good results. These materials are available from Ciba-Geigy under the trade names Tinuvin 770, Tinuvin 327, Tinuvin 213, Tinuvin 622 and Irganox 1010.

The curing catalyst can be present in the pressure sensitive adhesive composition at a level resulting in less than maximum crosslink density of the cured adhesive composition.

The following examples are illustrative of the fluoroalkylsilylated MQ tackifier resins of this invention and solvent-resistant PSA compositions containing same.

EXAMPLE 1

A fluoroalkylsilylating reaction medium was prepared containing the following:

| | |
|---|---|
| SR1000 solid MQ resin (GE Silicones) | 50.0 gram (about 0.065 mole SiOH) |
| Trifluoropropyltrimethoxysilane (TFPTMS) | 14.2 gram (0.065 mole) |
| Toluene | 50.0 gram |
| Water | 10.0 gram |

SR1000 and toluene were charged to a 250 cc reaction flask and agitated until a homogeneous solution was obtained. TFPTMS was added and a clear solution was obtained which was agitated at 80° C. Water was then added and the mixture slowly heated to reflux using a Dean-Stark trap to remove aqueous phase while the reflux temperature rose from 90° C. to 115° C. After holding at 115° C. reflux for 2 hours, the reaction mixture was cooled. 10.73 grams of aqueous phase were collected from the trap (10.0 grams water and 0.73 grams methanol, or 0.023 mole). Since 0.195 mole of methoxy was available for reaction with silanol groups on the MQ resin, about 12% of available methoxy was reacted indicating that about one-third of the TFPTMS had reacted with, and had chemically modified, the MQ resin. The clear solution obtained prior to addition of water and reflux had become very hazy at the end of the reflux period indicating that the fluoroalkylsilylated MQ resin product was no longer completely soluble in toluene.

EXAMPLE 2

A fluoroalkylsilylating reaction medium was prepared containing the following:

| | |
|---|---|
| 60 wt. % solution of MQ resin in toluene: | 164 gram (100 gram resin, about 0.13 mole SiOH) |
| TFPTMS | 28.3 gram (0.14 mole) |
| 37% aqueous HCl | 0.02 gram |
| Water | 20 gram |

The resin solution and TFPTMS were weighed into a 500 cc flask, agitated at 80° C., followed by the addition of water and the HCl to catalyze the hydrolysis reaction. Refluxing was commenced at 89° C., the temperature slowly rising to 116° C. as the aqueous phase was trapped off. 27.3 gram of aqueous phase were trapped off indicating that 7.3 grams of methanol were generated, or about 0.23 mole. 60% of available alkoxy groups had therefore chemically combined with the MQ resin indicating complete chemical insertion of fluoroalkyl groups into the MQ resin. A very hazy suspension resulted from the reaction. Toluene was removed by simple evaporation followed by vacuum drying at about 80° C. 118 grams of a friable fluoroalkylsilylated MQ resin product that retained less than 0.2 wt. % toluene residue were obtained.

EXAMPLE 3

A fluroalkylsilylating reaction medium was prepared containing the following:

| | |
|---|---|
| 60 wt. % solution of MQ resin in toluene | 164 gram (100 gram resin, about 0.13 mole SiOH) |
| TFPTMS | 14.2 gram (0.07 mole) |
| 37% aqueous HCl | 0.02 gram |
| Water | 20 gram |

The reaction was carried out substantially as in Example 2. A 22.0 gram aqueous phase was trapped out following reflux indicating that 2.0 g methanol was generated, about 0.063 mole. Approximately 30% of the available silane alkoxy groups were consumed indicating that about half the starting silanol content of the MQ resin was retained. 110 grams of a dried solid fluoroalkylsilylated MQ resin product were obtained.

EXAMPLES 4-18

PSA compositions were prepared which contained various combinations of (1) known, i.e., nonfluoroalkylsilylated, MQ tackifier resins and fluoroalkylsilylated MQ tackifier resins prepared in accordance with this invention, (2) non-fluorosilicone gums and fluorosilicone gums, and (3) solvents with all but one of the combinations containing butyl peroxide (BPO) curing catalyst. Thereafter, the PSA compositions were evaluated for their solvent resistance performance. The test procedure involved coating a targeted wet 2 mil build of each PSA on a 2 mil polyethylene terephthalate (PET) substrate and curing of the PSA employing a two step process of ambient solvent evaporation followed by oven dwell-peroxide crosslinking, usually at 177° C. Each PSA-coated substrate was then evaluated for qualitative tack and 12 inches per minute (ipm) peel adhesion from stainless steel panels using established silicone-based PSA test methodology. Solvent resistance was evaluated by cutting 1 inch wide strips of the PET-coated tapes, affixing a ¼ inch width of one end of each tape to either a standard glass microscope slide or to a Delrin® (DuPont polyoxymethylene) plaque. From the other end of each tape was suspended a 100 gm weight prior to immersion of the coated glass slides or Delrin® plaques with their affixed weighted tapes in xylene. The xylene was at ambient temperature and was gently stirred beneath the suspended tapes. The time from immersion in the xylene to the tapes losing adhesion to their substrates and falling (with attached weights) to the bottom of the container of xylene was recorded as shear. The length of time the weighted tapes withstood the delaminating effect of the xylene indicated the level of their resistance to this solvent.

In Table 1 below setting forth the results of the tack, adhesion and solvent resistance results for each PSA composition, the following abbreviations are used:

Non-FAS: nonfluroalkylsilylated MQ tackifier resin

FS: fluoroalkylsilylated MQ tackifier resin

Silane Adhesion Promoter A: 1 wt. % each of tri(3-[trimethoxysilyl]propyl)isocyanurate and λ-aminopropyltrimethoxysilane Adhesion Promoter B: 1 wt. % λ-aminopropyltrimethoxysilane Adhesion Promoter C: 1 wt. % tris(3-[trimethoxysilyl]propyl)isocyanurate BuOAc: butylacetate TFT: trifluorotoluene As these data show, PSA compositions in accordance with this invention, i.e., those containing fluoroalkylsilylated MQ tackifier resin, fluorosilicone gum and benzoyl peroxide (BPO) curing catalyst (Examples 10-15, 17 and 18), in most cases exhibited greater solvent resistance, and in the case of the PSA compositions of Examples 14, 15 and 17, much greater solvent resistance, than that of the PSA compositions containing non-fluorosilicone or fluorosilicone gum, non-fluoroalkylsilylated MQ tackifier resin and BPO (Examples 4-9). The PSA composition of Example 16 demonstrates by its absence the importance of crosslinking catalyst for achieving tack and adhesion.

EXAMPLES 19-33

These examples demonstrate the effect of increasing the fluoro content in the fluorosilicone gum component(s) of the PSA compositions, all of which contain the fluoroalkylsilylated MQ tackifier resin of Example 2 (containing trifluoropropyl groups), on their adhesive properties and solvent resistance.

The fluorosilicone gums used in these examples included 20, 50, and 100 mole % trifluoropropylmethylsiloxane-functional MQ resins. Test evaluations included xylene soak shear testing (described in Examples 4-18) for ¼ inch lap, 1 inch width tapes of the test PSA compositions coated and cured on 2 mil PET substrate and manually applied to glass slides and smooth Delrin® plaques, and peel adhesion of the tapes affixed to stainless steel panels. The latter test was run at a 12 inch/minute peel speed and a 180° angle using a TMI

TABLE 1

TEST RESULTS FOR PSA COMPOSITIONS

| Example | Silicone Gum | MQ Tackifier Resin | R/G, wt. | BPO, wt. % | Silane Adhesion Promoter | Solvent | Substrate | Shear, min. |
|---|---|---|---|---|---|---|---|---|
| 4 | polydi-methyl-silicone | non-FAS | 1.3 | 2.8 | — | BuOAc | Delrin ® | 85 |
| 5 | silanol-stopped 100% fluorosilicone (FSE 2080, GE Silicones) | non-FAS | 1.3 | 2.8 | — | BuOAc | glass | 85 |
| 6 | 20% Fluorosilicone soft gum | non-FAS | 1.3 | 2.8 | — | Toluene | glass | 70 |
| 7 | 20% Fluorosilicone soft gum | non-FAS | 1.3 | 2.8 | — | BuOAc | glass | 71 |
| 8 | 20% Fluorosilicone soft gum | non-FAS | 1.3 | 2.8 | — | BuOAc | glass | 100 |
| 9 | 20% Fluorosilicone soft gum | non-FAS | 1.3 | 2.8 | — | TFT | glass | 70 |
| 10 | 20% Fluorosilicone soft gum | FAS of Ex. 2 | 1.3 | 2.8 | — | TFT | glass | 85 |
| 11 | 20% Fluorosilicone soft gum | FAS of Ex. 3 | 1.3 | 2.8 | — | TFT | glass | 93 |
| 12 | 20% Fluorosilicone hard gum | FAS of ex. 2 | 1.3 | 2.8 | — | TFT | glass | 100 |
| 13 | 20% Fluorosilicone hard gum | FAS of Ex. 3 | 1.5 | 2.8 | — | TFT | glass | 105 |
| 14 | 20% Fluorosilicone hard gum | FAS of Ex. 3 | 1.5 | 2.8 | A | TFT | Delrin ® | 114 |
| 15 | 20% Fluorosilicone hard gum | FAS of Ex. 3 | 1.75 | 2.7 | A | TFT | Delrin ® | 119 |
| 16 | 20% Fluorosilicone hard gum | FAS of Ex. 3 | 1.5 | 0 | — | TFT | no tack. | no adhesion |
| 17 | 20% Fluorosilicone hard gum | FAS of Ex. 2 | 1.5 | 1.7 | B | TFT | Delrin ® | 123 |
| 18 | 20% Fluorosilicone hard gum | FAS of Ex. 2 | 1.5 | 1.7 | C | TFT | glass | 105 |

peel/release tester. The PSA-coated PET tapes were applied to clean steel panels and pressed onto the panels by 4 passes of a standard 1.8 lb. roller. Each PSA composition contained 2.5 wt % BPO crosslinking catalyst. The test results are set forth in Table 2 as follows:

TABLE 2

TEST RESULTS FOR PSA COMPOSITIONS CONTAINING FLUOROSILICONE GUM(S) POSSESSING DIFFERENT FLUORO CONTENTS

| Example | % Fluoro Content of Fluorosilicone Gum(s) | R/G (wt.) | Solvent | Shear, min. Glass | Shear, min. Delrin ® | Peel Adhesion |
|---|---|---|---|---|---|---|
| 19 | 20 | 1.0 | TFT | 150, 190 | 140, 165 | very low |
| 20 | 20 | 0.5 | TFT | 135, 145 | 150, 175 | 252 g |
| 21 | 100 | 1.0 | BuOAc | 380, 450 | 20, 30 | very low |
| 22 | 100 | 0.5 | BuOAc | >390 | 270, 380 | 59 g |
| 23 | 50 | 1.0 | TFT | 240, 335 | 75, 125 | 51 g |
| 24 | 50 | 0.5 | TFT | 275, 315 | 85 | 34 g |
| 25 | 50 | 0.25 | TFT | 285, 325 | 195, 225 | 122 g |
| 26 | 50 | 0.125 | TFT | no cohesive | strength | <10 g |
| 27 | 50 | 0.33 | TFT | 215, 275 | 195, 215 | 53 g |
| 28 | 1/1 20/50 | 1.0 | TFT | 255, 310 | 180 | 55 g |
| 29 | 1/1 20/50 | 0.5 | TFT | 180, 225 | 170, 205 | 126 g |
| 30 | 3/1 20/50 | 1.0 | TFT | 140, 217 | 240, 265 | 308 g |
| 31 | 3/1 20/50 | 0.5 | TFT | 200, 285 | 245, 270 | 323 g |
| 32 | 2/1 20/50 | 1.0 | TFT | 300, 340 | 310, 420 | 252 g |
| 33 | 2/1 20/50 | 0.5 | TFT | 335, 360 | 355, >450 | 158 g |

PSA compositions intended for label stock and machine converting applications must have sufficient adhesive bond strength to permit both quick stick (quick tack) of the substrates to which they are applied to the articles upon which the labels are to be affixed and should possess long term stability of adhesion. While most rubber-based and acrylic-based PSA's have peel adhesion (as determined by the testing methodology herein) of well over 500 g/in (to 20 oz or more), hand-applied labels will generally function well with lower peel adhesion, typically as little as 2-3 oz, since, once applied, the labels will not be subjected to significant mechanical stress. Such being the case, peel adhesion of greater than about 100 g/in is generally sufficient for the solvent-resistant label applications described supra, particularly if xylene shear exceeds 4 hours on different substrates. As the data in Table 2 show, a combination of good adhesion performance and superior solvent resistance is most evident where resin/gum ratios are less than about 1 and the fluorosilicone gum component(s) possess on average from about 20 to about 50 mole % trifluoropropyl groups.

EXAMPLES 34-40

There are many label applications requiring the use of thermally-sensitive label stock such as low flow-point films and, especially, direct thermal labels where barcode is thermally imaged on a label at the time of use. These label applications cannot accommodate peroxide or other cure requiring temperatures of greater than 100° C. for even a few seconds. In order for the PSA compositions of this invention to be useful for these thermally sensitive substrates (facestock), they must be applied without causing damage to them. A useful technique for achieving this is transfer lamination which requires that the PSA composition first be applied to a release surface (commonly a silicone-coated release liner), the liner bearing the PSA then being applied or pressed onto the desired facestock, typically employing nip lamination under pressure. In a successful transfer lamination process, the PSA coating will detach from the release liner and reattach to the facestock.

The capability for successful transfer of PSA compositions obtained in accordance with the invention was evaluated in these examples.

Coating formulations of conventional silicone release coatings SL6625 and SL7025 (linear and branched vinyl silicone polymer systems (GE Silicones), respectively) and of fluorosilicone FSR2000 release coating (GE Silicones) were prepared as 20 wt. % solutions in hexane and thereafter applied to 2 mil PET liner using a #8 Meyer rod mounted in a mechanical lab coater in a process well known to those skilled in the art. Cure was effected by 30 seconds of oven exposure at 120° C. resulting in approximately 1.5 $g/m^2$ deposition of release coating on the film. 2 mil wet build coatings of several PSA compositions (specifically, the PSAs of Examples 20-22, 25, 29, 31 and 33, supra) were then manually applied directly to the cured silicone release surface and air- and oven-dried as before. Each of the resulting articles consisted of a PET film successively coated with silicone release agent and a layer of BPO-crosslinked PSA composition. A sheet of direct thermal label paper facestock was then placed over each PSA and tightly bonded to the adhesive by passing the entire laminate through the nip of a laboratory laminator. The image side of the labelstock was at the top of the laminate. Carefully peeling the labelstock away from the rest of the laminate revealed whether or not the PSA composition detached from the release liner and adhered to the reverse side of the label material. Complete transfer of PSA composition to the labelstock was achieved in some cases and partial transfer and no transfer were observed in others. The test results are set forth in Table 3 as follows:

TABLE 3

TRANSFER LAMINATION TEST RESULTS

| Example | PSA Composition | % Fluoro Content of Fluorosilicone Gum | Fluorosilicone Release Coating (GE Silicones) | PSA Transfer Property |
|---|---|---|---|---|
| 34 | Example 20 | 20 | SL7025 | Excellent transfer to facestock |
| 35 | Example 21 | 100 | FSR2000 | Coats well on liner, but does not transfer |
| 36 | Example 22 | 100 | SL7025 | Does not wet out on liner |
| 37 | Example 25 | 50 | SL7025 | Incomplete transfer to facestock; "legging" of adhesive from liner |
| 38 | Example 29 | 35 | SL7025 | Excellent transfer to facestock |
| 39 | Example 31 | 27.5 | SL6625 | Excellent transfer to SL7025 facestock |
| 40 | Example 33 | 30 | SL6625 | Excellent transfer to SL7025 facestock |

These lamination transfer results are surprising in that the more highly fluorinated PSA compositions did not transfer from conventional release coatings on lamination to the direct thermal labelstock. The FSR2000 coating is partially fluorinated so that fluorosilicone PSAs bonded to this similar surface and did not release from it. The failure of the PSA of Example 25 and other 50% fluorosilicone PSAs to efficiently transfer might have been due to incomplete wetting out of the PSA on the release liners.

EXAMPLES 41-46

The effectiveness of the transfer lamination process described in Examples 34-40 was evaluated by determining peel adhesion of test samples of direct thermal facestock that had been laminated to certain of the fluorosilicone PSAs (specifically, those of Examples 29, 31 and 33, supra) where excellent adhesive transfer was observed. A number of 1 inch width tapes were cut from the laminate constructions, the release liners removed, and the samples of facestock coated with PSA were affixed to stainless steel test panels as previously described. Adhesive strength was measured at 12 ipm peel and at a 180° angle the results being set forth in Table 4 as follows:

TABLE 4

TRANSFER LAMINATION TEST RESULTS

| Example | PSA Composition | Fluorosilicone Release coating | Peel Strength, g/in | Results |
|---|---|---|---|---|
| 41 | Example 29 | SL6625 | 241 | >95% Adhesive failure |
| 42 | Example 29 | SL7025 | 111 | ~25% cohesive failure |
| 43 | Example 31 | SL6625 | 281 | >95% adhesive failure |
| 44 | Example 31 | SL7025 | 405 | >95% adhesive failure |
| 45 | Example 33 | SL6625 | 135 | 100% adhesive failure |
| 46 | Example 33 | SL7025 | 89 | >95% adhesive failure |

The reduction in peel adhesion from the values obtained for the PET tapes to which the PSAs were directly applied to the values obtained for the facestock tapes indicates that some loss of adhesion occurred during the transfer lamination process. These results might have been due to the mechanically different properties of PET substrates and direct thermal labelstock and/or the differences in the nature of the fluorosilicone-coated release liner. Adhesive failure indicates that as the labelstock tape is peeled from the stainless steel panel, the adhesive lifts cleanly off the panel; cohesive failure is indicated by some PSA shearing from the tape and adhering to the test panel. However, these results clearly demonstrate that the PSA compositions of the instant invention can be successfully applied to thermally sensitive substrates such as direct thermal image facestock by means of transfer lamination from a conventional silicone release coating.

EXAMPLES 47-52

These examples illustrate the preparation of fluoroalkylsilylated MQ resin of the type $MD^{Vi}Q$ where D is vinylsilane-derived functionality such as $(H_2C{=}CH)Si(CH_3)O$, and their non-coupled and coupled combinations with fluorosilicone gum(s) followed by biphenyl peroxide (BPO) curing to provide PSA compositions with superior solvent resistance and good adhesive properties.

MQ tackifier resins that include vinyl functionality $D^{Vi}$ are known. These resins can be prepared by the hydrolysis of $Me_3SiCl$ with $(RO)_4Si$ or aqueous sodium silicate in the presence of vinyl (i.e., $CH_2{=}CH{-}$) functional chloro- or alkoxy-silanes such as $MeViSiCl_2$ or $Me_2ViSiCl$. The stoichiometry of the resultant resin is controlled by adjustment of the silane charge. A vinyl-functional $MD^{Vi}Q$ resin of approximate stoichiometry $M_{0.7}D^{Vi}_{0.1}Q$ and containing approximately 1.6% silanol (as OH) in its uncondensed form and provided as a 60 wt. % solids solution in xylene (GE Silicones) was fluoroalkylsilylated with varying amounts of fluoroalkylsilane to provide several $MD^{Vi}Q$ tackifier resins.

A fluoroalkylsilylating reaction medium was prepared containing the following:

| | | |
|---|---|---|
| $MD^{Vi}Q$ resin dissolved in xylene | 180 | g (108 g resin solids, approximately 0.1 mole OH) |
| TFPTMS | 21.8 | g (0.1 mole) |
| Water | 22 | g |
| 37% aqueous HCl | 0.02 | g |

$MD^{Vi}Q$ resin in xylene solution and TFPTMS were weighed into a 1 liter reaction flask and then brought to 80° C. with agitation. Water and HCl solution were added. A vigorous reflux commenced as reaction temperature was increased to 88° C. A Dean-Stark trap gradually removed the aqueous phase (a methanol/water azeotrope) while reflux temperature increased to xylene boiling point. Reflux continued for two hours. Removal of solvent by nitrogen stream and vacuum provided 118 g of a friable white powder (Fluoroalkylsilylated Resin A) similar to the fluoroalkylsilylated MQ tackifier resins previously described. About 60% of theoretically possible methanol was generated by reaction of the methoxy groups of the silane with the silanol groups on the $MD^{Vi}Q$ resin.

Additional fluoroalkylsilylated resins were prepared in substantially the same manner as described above but with varying amounts of TFPTMS relative to the resin silanol content (Fluoroalkylsilylated Resin B, an MQ resin treated with 50 wt. % stoichiometric TFPTMS, and Fluoroalkylsilylated Resin C, an $MD^{Vi}Q$ resin treated with 50% stoichiometric TFPTMS). These fluoroalkylsilylated resins were combined with fluorosilicone gums and different levels of BPO in TFT solvent to a uniform 30% solids level to provide noncoupled (i.e., non-chemically condensed) PSA compositions which were then applied as approximately 0.8 mil cured coatings on 2 mil PET substrate and tested for peel adhesion and xylene-resistant shear as previously described. The test results are set forth in Table 5 as follows:

TABLE 5

TEST RESULTS FOR NON-COUPLED PSA COMPOSITIONS

| Example | Fluorosilicone Gum, % Fluoro Content | Fluoroalkyl-silylated $MD^{Vi}Q$ Resin | R/G | wt. % BPO | Peel Adhesion | Shear, min. Glass | Shear, min. Delrin ® |
|---|---|---|---|---|---|---|---|
| 47 | 2/1 20/50 | A | 0.5 | 2.5 | 362 g/in | 343 | 285 |
| 48 | 2/1 20/50 | B | 0.5 | 2.5 | 284 g/in | 273 | 348 |
| 49 | 2/1 20/50 | C | 0.5 | 2.5 | 247 g/in | 303 | 215 |
| 50 | 2/1 20/50 | B | 0.5 | 1.0 | 589 g/in | 390 | 300 |
| 51 | 2/1 20/50 | B | 0.5 | 2.0 | 345 g/in | 290 | 250 |
| 52 | 2/1 20/50 | B | 0.5 | 3.0 | 181 g/in | 210 | 160 |

As these data show, superior adhesive properties resulted from reduced levels of BPO curing catalyst, thought to be due to lower crosslink densities lowering the Tg of the PSAs with a consequent improvement in tack and peel properties.

EXAMPLES 53-55

Three additional PSA compositions were prepared via conventional base-catalyzed processes where TFPTMS-fluoroalkylsilylated MQ tackifier resin (Example 3) was chemically coupled by condensation to fluorosilicone silanol gum(s). The coupled PSAs were formulated as indicated in Table 7 below:

TABLE 7

COUPLED PSA COMPOSITIONS

| Component | Example 53 | Example 54 | Example 55 |
|---|---|---|---|
| Fluorosilicone Gum(s) | 30 mole % fluoro, 163.5 g | 20 mole % fluoro, 163.5 g | 30 mole % fluoro, 81.8 g |
| MQ Resin | FAS-treated 81.9 g | FAS-treated MQ, 81.9 g | FAS-treated MQ, 81.9 g |
| TFT | 200.6 g | 200.6 g | 200.6 g |
| 10% NaOH | 0.15 g | 0.15 g | 0.15 g |
| 10% $H_3PO_4$ | 0.20 g | 0.20 g | 0.20 g |

The preparative procedure was substantially the same for each PSA composition. TFT solvent, the fluorosilicone gum(s), MQ resin (FAS-treated) and NaOH solution were weighed into a clean gum pot equipped with overhead stirrer, nitrogen inlet and Dean-Stark trap. The trap was filled with TFT solvent, nitrogen atmosphere was established and mixing was carried out until a clear, uniform solution was obtained. The agitated mixture was brought to 115° C. reflux for 2 hours, then cooled and neutralized with phosphoric acid. A small amount of aqueous phase was trapped out. The PSAs were obtained as viscous fluids of approximately 54 wt. % solids in TFT solvent. The PSA compositions of Examples 53-55 vary according to the fluoro content of their fluorosilicone gum base; R/G ratio is 0.5 in each case.

The foregoing PSA compositions were diluted to a uniform 30% solids content with additional TFT solvent, then treated with 1% (w/w) BPO, coated at selected coatweights on 2 mil PET substrate or on silicone release-coated PET, cured by combinations of 5 minutes exposure at 75° C. then 10 minutes oven dwell at 177° C. Peel adhesion results were recorded for 1 inch strips as g/in peel force from stainless steel panels at 12 ipm peel speed. Xylene resistant shear for 1 inch strips applied to glass was also measured as before. The results are set forth in Table 7 as follows:

TABLE 7

TEST RESULTS FOR COUPLED PSA COMPOSITIONS

| PSA Composition | Coating Thickness | Peel Adhesion (on PET) | Shear (on glass) |
|---|---|---|---|
| Example 53 | 1.8 mil | 397 g/in | 290 minutes |
| Example 53 | 0.8 mil | 547 g/in | 400 minutes |
| Example 54 | 1.9 mil | 440 g/in | 240 minutes |
| Example 55 | 1.7 mil | 631 g/in | 330 minutes |
| Example 55 | 0.8 mil | 671 g/in | 380 minutes |

As these data show, both peel adhesion and shear improve at lower PSA coatweights.

The PSA composition of Example 55 was also tested for transfer from a release liner to a direct thermal image facestock employing the procedure previously described. The 30 wt. % solids solution of the PSA was blended with 1% (w/w) BPO cure agent followed by direct application of a 1.9 mil (dry) thickness coating of the PSA to a coating of SL6625 silicone release agent (GE Silicones) on 2 mil PET, cured by 5 minutes dwell at 75° C., then 10 minutes dwell at 177° C. A sheet of direct thermal image facestock was laminated to the adhesive layer using the nip of a laboratory laminator. The complete laminate construction was left for a day at ambient temperature. A 1 inch strip was cut from the laminate and the facestock peeled from the release liner/adhesive lamina. The PSA composition completely and cleanly transferred to the facestock from the liner without damage to the former. The resulting tape of PSA-coated facestock was affixed to a stainless steel panel and peel adhesion of the label was measured at 12 ipm peel speed. Results of 480 g/in and 464 g/in were obtained in duplicate indicating minimal loss of peel adhesion from the transfer process.

While the invention has been described with reference to certain embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out the process of the invention but that the invention will include all embodiments falling within the scope of the appended claims.

What is claimed is:

1. A fluoroalkylsilylated $MD^{Vi}Q$ resin.

2. The fluoroalkylsilylated MQ resin of claim 1 obtained by the process which comprises reacting silanol-containing $MD^{Vi}Q$ resin with a fluroalkylsilane.

3. The fluoroalkylsilylated $MD^{Vi}Q$ resin of claim 2 wherein the fluoroalkylsilane is of the general formula:

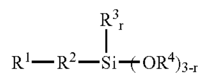

where $R^1$ is a partly or totally fluorinated alkyl group of up to 26 carbon atoms, $R^2$ is a chemically stable divalent bridging group linking fluoroalkyl group $R^1$ with alkoxy group(s) —$OR^4$, $R^3$ and $R^4$ each, independently, is alkyl of from 1 to 6 carbon atoms or aryl of from 6 to 8 carbon atoms and r is 0, 1 or 2.

4. The fluoroalkylsilylated $MD^{Vi}Q$ resin of claim 3 wherein $R^2$ is the group —$(CH_2)_n$— in which n is 2 to 20, the group —$(CH_2)_n$— x —$(CH_2)_p$— in which x is —O— or —C(O)O—, n is 0 to 2 and p is 5 to 25, or the group -Q-S—$(CH_2)_q$— in which Q is a divalent group containing at least one oxygen atom and q is 2 or 3.

5. The fluoroalkylsilylated $MD^{Vi}Q$ resin of claim 4 wherein the fluoroalkylsilane is selected from the group consisting of 3,3,3-trifluoropropyltrimethoxy-silane, 3,3,3-trifluoropropyltriethoxysilane, 3,3,3-trifluoropropylmethyldimethoxysilane, 3,3,3-trifluoropropyldimethylmethoxysilane, 4,4,4-trifluorobutyltrimethoxysilane, 4,4,4-trifluorobutyltriethoxysilane, 3,3,4,4,4-pentafluorobutyltrimethoxysilane, 3,3,4,4,4-pentafluorobutyltriethoxysilane, 3,3,4,4,5,5,6,6,7,7,8,8,8-tridecafluorooctyltrimethoxysilane, 3,3,4,4,5,5,6,6,7,7,8,8,8-tridecafluorooctyltriethoxysilane, 3,3,4,4,5,5,6,6,7,7,8,8,9,9,10,10,10-heptadecafluorodecyltrimethoxysilane, 3,3,4,4,5,5,6,6,7,7,8,8,9,9,10,10,10-heptadecafluorodecyltriethoxysilane, 15-(trifluoroethoxy) pentadecyltrimethoxysilane and 15-(trifluoroacetoxy) pentadecylmethyldiethoxysilane.

6. A pressure sensitive adhesive composition comprising a fluoroalkylsilylated $MD^{Vi}Q$ resin of claim 1, a gum, and at least one additional component selected from the group consisting of filler, silane adhesion promoter, plasticizer, solvent, thixotropic agent, U.V. stabilizer, curing catalyst and antioxidant.

7. The pressure sensitive adhesive composition of claim 6 wherein the gum is a silicone gum, the fluoroalkylsilated $MD^{Vi}Q$ resin being noncoupled or coupled to the gum.

8. The pressure sensitive adhesive composition of claim 7 wherein the silicone gum is a fluorosilicone gum, the fluoroalkylsilylated $MD^{Vi}Q$ resin being noncoupled or coupled to the gum.

9. The pressure sensitive adhesive composition of claim 8 which includes a silane adhesion promoter.

10. The pressure sensitive adhesive composition of claim 6 wherein the curing catalyst is present at a level resulting in less than maximum crosslink density of the cured adhesive composition.

* * * * *